July 24, 1962 J. J. MONAHAN ETAL 3,045,715

APPARATUS FOR MOUNTING WIRES ON ARTICLES

Filed Nov. 12, 1958 4 Sheets-Sheet 1

INVENTORS
J. J. MONAHAN
R. C. SHAFER
By W. J. Johnson
ATTORNEY

APPARATUS FOR MOUNTING WIRES ON ARTICLES

Filed Nov. 12, 1958 4 Sheets-Sheet 2

INVENTORS
J. J. MONAHAN
R. C. SHAFER
By [signature]
ATTORNEY

APPARATUS FOR MOUNTING WIRES ON ARTICLES

Filed Nov. 12, 1958 4 Sheets-Sheet 3

INVENTORS
J. J. MONAHAN
R. C. SHAFER
By W. A. Johnson
ATTORNEY

July 24, 1962 J. J. MONAHAN ETAL 3,045,715

APPARATUS FOR MOUNTING WIRES ON ARTICLES

Filed Nov. 12, 1958 4 Sheets-Sheet 4

INVENTORS
J.J.MONAHAN
R.C.SHAPER
By W. A. Johnson
ATTORNEY

United States Patent Office 3,045,715

Patented July 24, 1962

3,045,715
APPARATUS FOR MOUNTING WIRES ON ARTICLES

Jack J. Monahan, Allentown, and Richard C. Shafer, Emmaus, Pa., assignors to Western Electric Company, Incorporated, New York, N.Y., a corporation of New York Filed Nov. 12, 1958, Ser. No. 773,343
6 Claims. (Cl. 140—112)

This invention relates to apparatus for mounting wires on articles particularly semi-conductor devices.

In the manufacture of various devices it is necessary to position lead wires very accurately before securing them in position. In one type of junction transistor, for example, a bar having two outer N portions and a central P portion, is disposed between and connected to two main leads of the transistor. A base lead has a tinned metallic ribbon fixed thereto and a base wire of a predetermined formation is to have one end bonded to the P portion of the bar and the other end soldered to the ribbon on the base lead.

The object of the present invention is an apparatus for automatically and efficiently forming successive wires and mounting them on articles.

According to the object, the invention includes an apparatus for mounting a wire on a part, of an article, having first and second portions including means to move the wire into engagement with the first portion at which time means is energizable to cause relative movement of the wire and part until the wire engages the second portion where it will be secured to the part.

More specifically, the apparatus includes the automatic feeding of parts to a bonding station and from the bonding station to a soldering station during actions of various tools to advance wire from a supply successively, like distances through a fixed apertured guide and after each advanced movement of the wire a length is cut therefrom, given a right angle bend while the feeding means flattens the leading end of the formed wire. After the forming operation is completed grippers take possession of the formed wire and move it to a position short of the part, which in the present instance is an NPN bar of a transistor. The grippers at this time rest on a support which is lowered by a motor drive for the support until the leading end of the wire engages one of the N portions of the bar, at which time a motor drive will be de-energized. Also when the wire engages the N portion another motor is energized to cause relative movement of the bar and wire until the wire leaves the N portion and engages the P portion at which time the second motor will be de-energized and a bonding circuit is closed to bond the wire to the P portion of the bar. While this operation takes place, a previously bonded wire of another transistor is having its other end soldered to the ribbon of the base lead.

Other objects and advantages will be apparent from the following detailed description when considered in conjunction with the accompanying drawings, wherein.

Figure 1:
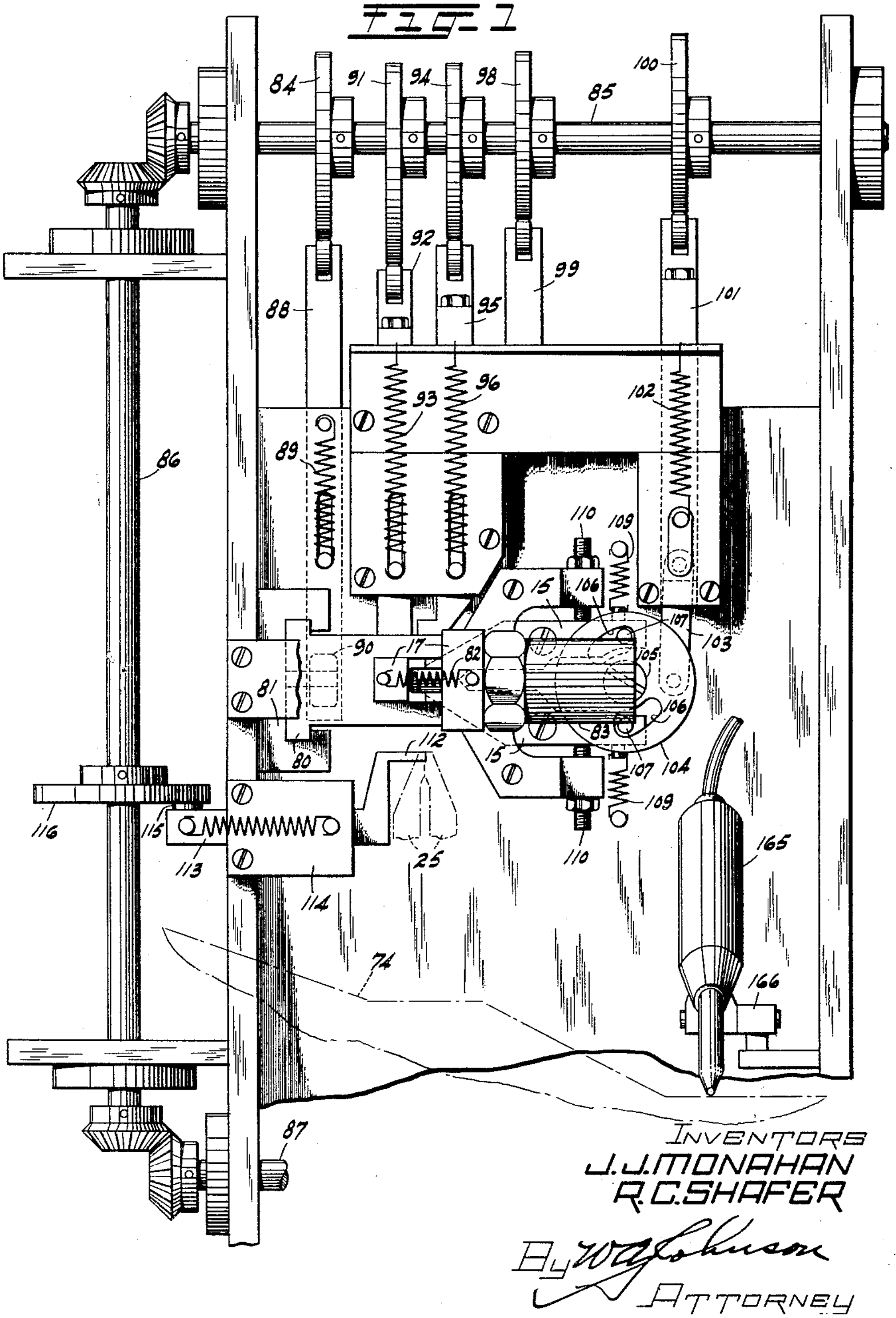
FIG. 1 is a front elevational view of the apparatus, portions thereof being removed.
Figure 2:
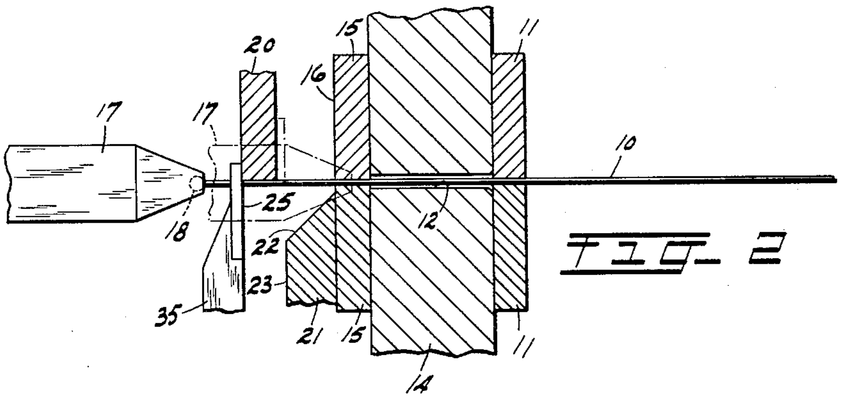
FIG. 2 is an enlarged fragmentary sectional view of the wire feeding and forming mechanism.
Figure 5:
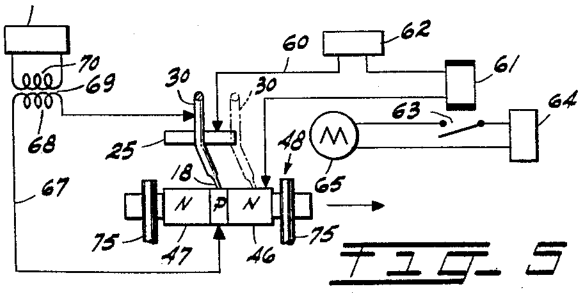
FIG. 5 is a schematic illustration of the transfer of the wire from one portion to another of the part.
Figure 6:
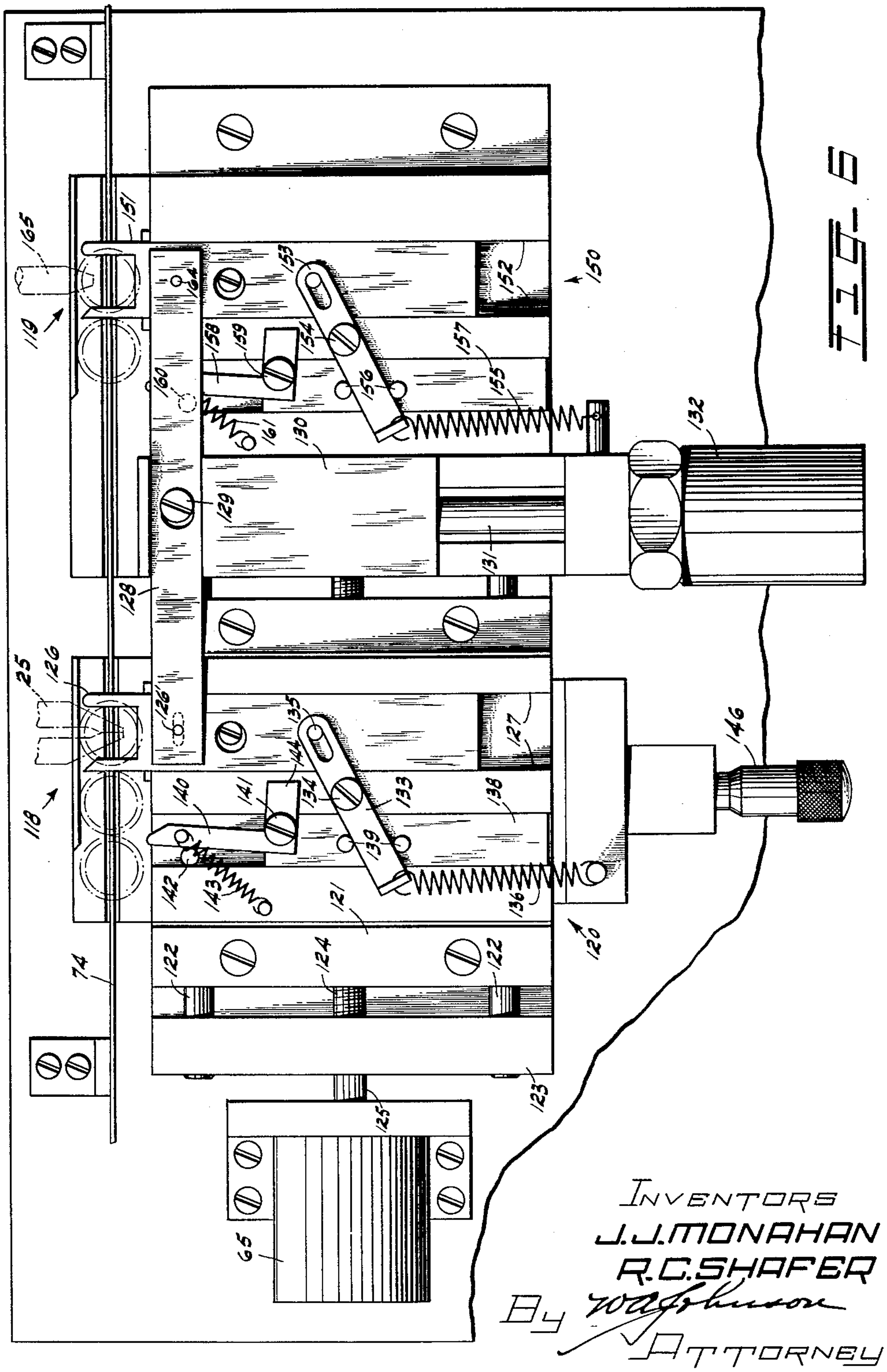
FIG. 6 is a top plan view of the portion of the apparatus surrounding the bonding and soldering stations.
Figure 7:
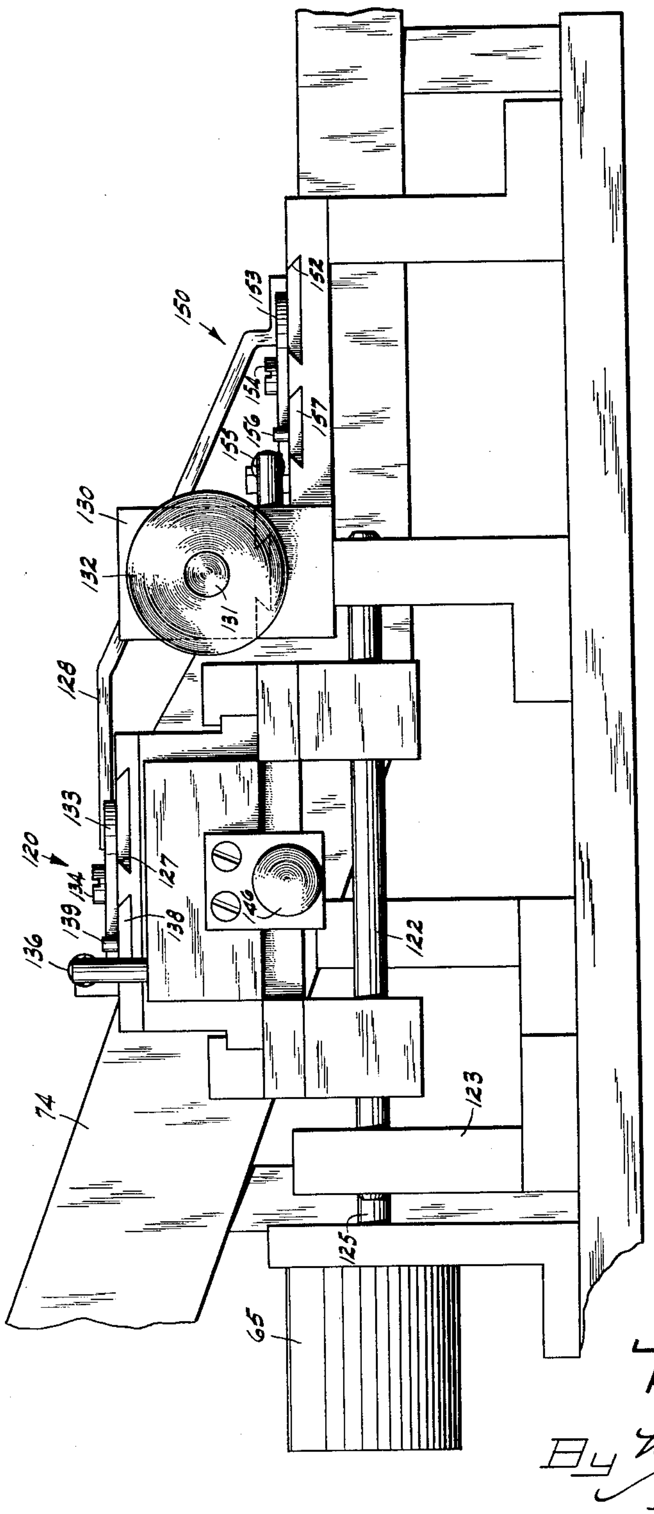
FIG. 7 is a front elevational view of the structure shown in FIG. 6.

To more clearly understand the structure shown in FIGS. 1, 6 and 7, attention is directed first to FIGS. 2, 3, 4, and 5. A wire 10 is drawn from a supply (not shown) and threaded between back clamps 11, through an aperture 12 in a stationary guide 14, between front jaws 15 and to a plane with the front faces 16 of the jaws 15. Feeding jaws 17 are moved into open and closed positions, and travel between the inner dotted position and the outer solid line position. When the feeding jaws 17 move to the right in open position, the jaws 15 are opened to permit access to the wire and the jaws 11 remain closed to hold the wire 10 against movement to the right. The feeding jaws are closed on the leading end of the wire in the position shown in dotted lines (FIG. 2) at which time the leading end of the wire is gripped sufficiently by the jaws to produce a flattened end 18. The wire is advanced the given distance, as shown in FIG. 2, and held by the feeding jaws while the front jaws 15 are closed. A forming tool 20 is lowered so that its lower end will engage the wire between the jaws 15 and 17 after which a cutter 21 is actuated. The cutter 21 cooperates with the jaws 15 to cut the wire in the plane of the surface 16 and then the tapered surface 22, the outer surface 23 of the cutter cooperate with the tool 20 to produce a right angle bend in the cut wire. The wire thus formed is held by the feed jaws 17 while the cutter 21 returns to its normal position. The tool 20 remains in its forming position to assist the feeding jaws 17 in supporting the formed wire while a pair of grippers 25 move upwardly to straddle and grip the formed wire. At this time, the tool 20 returns to its starting position and the jaws 17 are opened to free the formed wire.

The grippers 25 are pivotally supported at 27 on a cam follower 28 which may be mounted in suitable guide means, not shown, and caused to follow a cam 29. The function of the cam 29 is to move the pivot 27 vertically to raise the grippers 25 to receive the formed wire, which at this time will be identified by the number 30, and lower the pivot 27 to lower the grippers to a second forming position. Another cam 32 causes reciprocation of a follower 33 against the force of a spring 34 to rock the grippers 25 into their vertical positions and return the grippers to their substantially horizontal position shown in FIG. 4.

In actual practice the grippers 25 are mechanically actuated into open and closed positions. The grippers and the actuating mechanism are supported by an arm 35 which is mounted on the pivot 27 and has a projection 36 supporting a pin 37 which is engaged by a bifurcated member 38 mounted on the follower 33. The cam 32 and its follower 33 with the member 38, after returning the arm 35 to its substantially horizontal position, permits it to rest freely on a support 40 which is mounted on an end 41 of a micrometer unit 42. The micrometer unit 42 has a bellows-type connection 43 with a motor 44 and is supported in its vertical position in such a way that when the fixed position motor 41 is energized to drive the rotatable portion of the micrometer unit 42 the support 40 will be lowered gradually until the flattened end 18 of the formed wire 30 engages the adjacent N portion 46 of the part or NPN bar 47 of the transistor 48 located at the bonding station. The schematic control for the motor 44 includes a circuit 50 for the motor which receives electrical energy from a source 51. The circuit 50 includes a normally open switch 52 which is closed by the arm 35 coming to rest upon the support 40 and a normally closed contact 53 of a relay 54. Therefore the moment the arm 35 comes to rest upon the support 40, which is normally positioned to stop the grippers 25 with the flattened end 18 of the wire 30 short of the bar 47, the switch 52 closes the circuit 50 to energize the motor 44 to drive the unit or micrometer 42 to lower the support until the wire engages the N portion 46. At this time a circuit 56 receiving electrical energy from a source 57 is closed to energize relay 54 to open its normally closed contact 53 and thereby open the circuit 50. Any suitable means may be employed to return the support 40 to its normal position.

Attention is now directed to FIG. 5 particularly with the formed wire 30 in the broken line position engaging the adjacent N portion 46. The moment the wire engages this portion a circuit 60 is closed to energize a relay 61, the circuit including a source 62 of electrical energy. Energization of relay 61 will close its normally open contact 63 to complete a circuit from a source of electrical energy 64 through a motor 65. The motor 65 causes relative movement of the wire 30 and the bar 47. In the present instance, the wire 30 is held against movement by its grippers 25 while the supporting or holding means for the part or transistor moves the part with the bar 47 in the direction of the arrow to move the N portion of the bar away from the wire and to move the P portion into engagement with the wire. As soon as the wire 30 leaves the N portion, the circuit 60 is opened, de-energizing the relay 61, allowing its contact 63 to open the circuit to the motor 65 at which time the motor will be stopped and movement of the bar will be terminated with the wire 30 engaging the P portion of the bar. When the P portion engages the wire 30 another circuit is completed through the wire and the P portion to bond the end 18 of the wire to this portion of the bar. The bonding circuit is illustrated schematically at 67 receiving its electrical energy forming secondary winding 68 of a transformer 69 a primary winding 70 of which receives its energy from a source 71 of electrical energy.

Before leaving sheet 2 of the drawings, attention is directed to the part on which the wire 30 is mounted. In the present instance the part is an NPN bar 47 of a transistor 48 having a head 73 which rides upon a track 74 with the two main leads 75 positioned upon one side of the track and the base lead 76 on the other side. The main leads have the bar 47 mounted thereon while the base lead 76 has a ribbon 77 secured thereto and being sufficiently wide to have its bent upper end engaged by the outer end 78 of the wire 30 during the lateral movements of the wire. The ribbon 77 has been tinned previously so that when heat is applied to the ribbon, the end 78 will be soldered thereto.

The apparatus as shown in FIG. 1 includes a slide 80 mounted in a guide 81 for supporting the feeding jaws 17. One of the feeding jaws 17, shown at the right in FIG. 1, is fixed to the slide 80 while the other is movable relative thereto. A spring 82 normally holds the jaws 17 open whereas an air cylinder 83 is operated during predetermined intervals to close the feeding jaws. The slide 80 supporting the feeding jaws is under the control of a cam 84 which is mounted on a cam shaft 85, driven through its connection at another cam shaft 86 and a drive shaft 87. A cam follower 88 is supported for reciprocable vertical movement and is caused to follow its cam by the force of a spring 89. The follower 88 in itself has a cam-like formation near its lower end to engage a roller 90 carried by the slide 80 to bring about the movements of the feeding jaws 17 between the broken line and solid line positions shown in FIG. 2.

The cutter 21 is under the control of a cam 91 on the cam shaft 85 as it is supported by a follower 92 which is held in engagement with the cam by a spring 93. The forming tool 20 is under the control of a cam 94 and is supported by a follower 95 which is caused to follow its cam by a spring 96. The back jaws 11 are under the control of a cam 98 and suitable means, not shown, actuated by a cam follower 99. A cam 100 on the cam shaft 85 actuates its follower 101 under the force of a spring 102 to move a link 103 to rock an element 104 about its pivot 105. The element 104 is in the form of a cam having cam-like apertures 106 cooperating with pins 107 carried by the jaws 15 to move the jaws into open positions. The front jaws 15 are under the force of springs 109 which hold the jaws closed normally against adjustable stops 110.

Figures 3, 4:
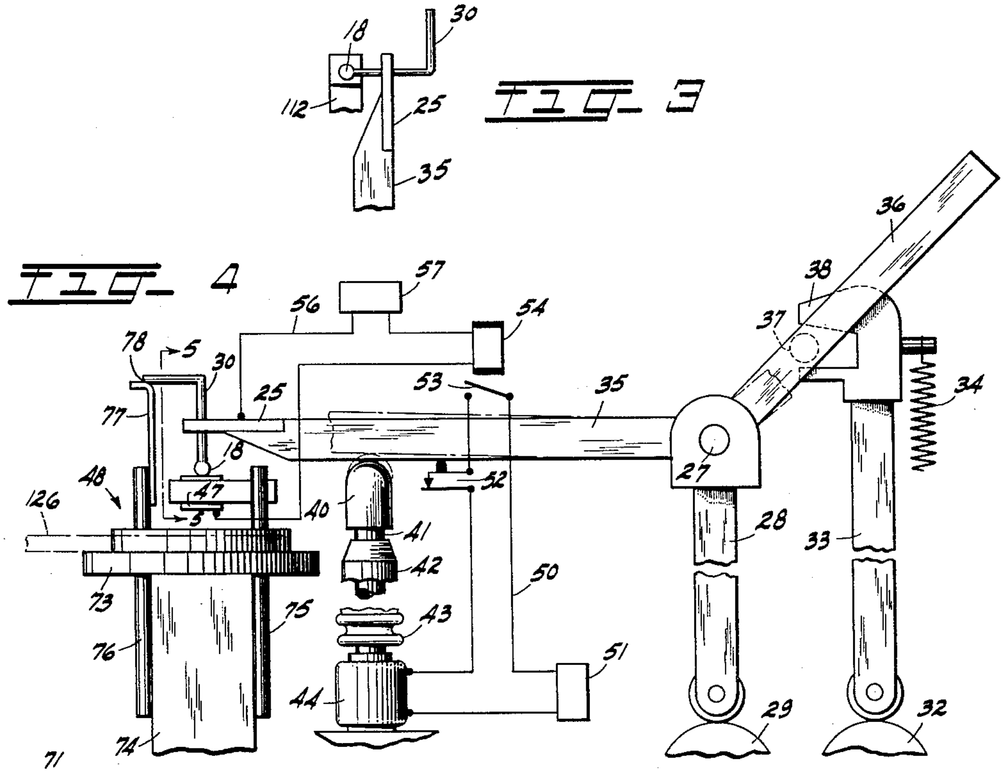
FIG. 3 is a fragmentary detailed view of a portion of the apparatus illustrating another bending operation.
FIG. 4 is a side elevational view of a portion of the apparatus illustrating the movement of the wire toward the part of the article.

While the grippers 25 are in their vertical positions, having been lowered by the cam 29 from the area of the feeding jaws 17 where they have received the formed wire 30, the flattened end 18 of the wire is located as shown in FIGS. 1 and 3 adjacent a bending element 112. The element 112 is moved outwardly a given distance to produce the bend in the wire that is illustrated in FIG. 5. The purpose of this bend in the wire is to produce a smoother movement of the end of the wire on the bar 47. The element 112 is a part of a cam follower 113 which is slidable in a guide 114 and has a roller 115 mounted thereon to ride in a groove, not shown, of a cam 116 which is mounted on the shaft 86. The groove in the cam 116 is designed to cause the element 112 to bend the wire 30, then move the element out of the path of the grippers as they are moved about the pivot 27 to rest upon the support 40.

The track 74 tapers downwardly from a feeding station to a bonding station, indicated generally at 118, and from the bonding station to a soldering station indicated generally at 119. A unit 120 adjacent the bonding station is supported by a carriage 121 which is mounted for lateral movement on parallel rods 122 mounted in a main frame 123. The carriage 121 has a threaded element, not shown, disposed in engagement with a screw 124 which is held against longitudinal movement in bearings disposed in the frame 123 and is rotatable relative to the threaded element of the carriage. The screw 124 is connected to a drive shaft 125 of the motor 65 and serves to cause lateral movement of the carriage 121 and the unit 120 when the motor 65 is energized to bring about movement of the bar 47, FIG. 5 to move the N portion 46 from engagement with the wire 30 and move the P section in engagement therewith. The unit 120 includes a bifurcated holder 126 slidable between guides 127 and adapted to straddle each article moved into the bonding station to properly position it to receive the formed wire 30. The holder 126 is connected at 126′ to a bar 128 which is connected at 129 to a slide 130. The slide 130 is supported for longitudinal movement and is fixed to a piston rod 131 of an air cylinder 132. The air cylinder is operated at predetermined intervals by suitable means, not shown, to move the holder 126 relative to the bonding station to free one article after the wire is bonded to the bar thereof and to receive the next article. A lever 133 pivotally mounted at 134 and connected at 135 to the holder 126, is normally actuated by a spring 136 to urge the holder 126 into the position shown in FIG. 6 and to return a feeding slide 138 to its normal position. The slide 138 has pins 139 mounted on each side of the lever 133 to form operative connection therewith. An advancing element 140 pivotally mounted at 141 at the slide 138 is normally held against a pin 142 of the carriage 121 by a spring 143. The pin 142 acts as a cam against the element 140, causing it to move about its pivot to cause the element to engage the next article and move it into the bonding station.

The unit 120, in addition to being movable laterally with its carriage 121 during energization of the motor 65 is adjustable longitudinally of the carriage by a micrometer means 146 to bring about a desired relationship between the holder 126, the feeding means or element 140 and the track 74.

A unit 150 is similar in structure to the unit 120 only in the structure of the holding and advancing means for the articles. The unit 150 is at a lower level adjacent the second or soldering station as illustrated in FIG. 7 and is fixed to the frame 123. The unit 150 has a holder 151 which is identical with the holder 126 and is slidable between guides 152. A lever 153 identical with lever 133 is pivoted at 154 and is urged to move the holder 151 in the position shown by a spring 155. Pins 156 of a slide 157 connected the lever 153 operatively thereto. The slide 157 has a feeding element 158 pivotally connected at 159 thereto and urged counter-clockwise against a pin 160 by a spring 161. The element 158 when moved with the slide 157 will be given a cam or rocking action by the pin 160 to engage the next article at the soldering station and force the article into the soldering station to be received by the holder 151. The bar 128 is connected at 164 to the holder 151 to be actuated through operation of the air cylinder 132. A soldering unit 165 is mounted at 166 in FIG. 1 to direct hot air or gases to the juncture of the end 78 of the wire 30 and the ribbon 77, FIG. 4, to bring about soldering of these members together.

*Operation*

During the continued operation of the apparatus with the articles supplied to the track 74, the wire 10 is advanced intermittently through the actuation of the jaws 11, 15 and 17 following the actions of their respective cams 98, 100 and 84. During the feeding motion of the wire by the feeding jaws 17, the end portion is flattened at 18 and at the end of the feeding stroke, the forming tool 20 is lowered and the cutter 21 is raised through the action of their cams 94 and 91 respectively to cut a length from the wire and produce a right angle bend therein, forming what is then identified as the formed wire 30. At this time the grippers 25 take the wire from the feeding jaws lower the wire into alignment with the element 112 where the flattened end portion of the wire is bent, after which the cam 32 causes the follower 33 and its bifurcated member 38 to move the grippers with the wire 30, about the pivot 27 where they, or the arm 35 therefor, will come to rest upon the support 40 in its up position. The moment the grippers, or the arm 35 therefor, come to rest upon the support 40, the switch 52 is closed to energize the motor 44 to cause lowering of the support and with it the grippers 25 until the leading end 18 of the wire 30 engages the N portion 46 of the bar 47 at which time the motor 44 is de-energized. At this time the motor 65 is energized to drive the screw 124 to move the unit 120 with the article in the bonding portion to move the N portion of the bar from beneath wire 30 and to move the P portion into engagement therewith, causing de-energization of the motor 65 and closing of the bonding circuit 67 to bond the wire to the central or P portion of the bar. At this time the grippers 25 are released from the bonded wire 30, by supportable means not shown and moved into a vertical position to receive the next formed wire 30. The air cylinder 132 operates in one direction to actuate the holders 126 and 151 to free articles from the bonding and soldering stations and to actuate their elements 140 and 158 to move the next articles into these stations. The air cylinder 132 is operated in the other to position and hold articles on the track 74 for the next operating cycle. The soldering of the ends 78 of the wires 30 to the ribbons 77 on the base leads is brought about automatically during the application of heat for predetermined periods to these portions through the soldering unit 165. Therefore, with the structure shown in FIGS. 6 and 7, the bonding and soldering operations are performed simultaneously and also the units 120 and 150 are operated by a single means 132 simultaneously. The unit 120 is moved laterally to bring about the action illustrated in FIG. 5 while the unit 150 is mounted at a fixed position. The motor 65 may be of the reversible type to return the unit 120 to its normal or starting position prior to moving the next article into the bonding position or the threaded element connected to the screw 124 may be released so that the unit 120 may be returned to its starting position by other means, not shown.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In an apparatus for mounting a wire on a part of an article having a first portion and a second portion, grippers for the wire supported for movement between a loading position where, they receive the wire, and a support for the grippers where the wire will be closely adjacent but out of contact with the part, means operable to feed the wire to the grippers, means to move the support to move the grippers with the wire toward the part and until the leading end of the wire engages the first portion of the part, means energizable by the engagement of the wire with the first portion to cause relative movement of the wire and part until the wire engages the second portion, and means to secure the wire to the second portion.

2. In an apparatus for mounting a wire on a part of an article having a first portion and a second portion, grippers for the wire supported for movement between a loading position, where they receive the wire, and a support for the grippers where the wire will be closely adjacent but out of contact with the part, means operable to feed the wire to the grippers, means to give the leading end portion of the wire a diagonal bend, means to move the support to move the grippers with the wire toward the part and until the leading end of the wire engages the first portion of the part, means energizable by the engagement of the wire with the first portion to cause relative movement of the wire and part until the wire engages the second portion, the diagonal bend of the leading end portion facilitating smooth dragging of the wire on the first portion to the second portion, and a circuit for a bonding current closed by the wire engaging the second portion to cause bonding of the wire to the second portion.

3. In an apparatus for mounting a wire on a part of an article having a first portion and a second portion, grippers for the wire supported for movement between a loading position, where they receive the wire, and a support for the grippers where the wire will be closely adjacent but out of contact with the part, means operable to feed the wire to the grippers, an energizable unit for moving the support, a normally open circuit for the unit closed when the grippers engage the support and opened when the leading end of the wire engages the first portion of the part to stop movement of the support, means energizable by the engagement of the wire with the first portion to cause relative movement of the wire and part until the wire engages the second portion, and means to secure the wire to the second portion.

4. An apparatus for mounting the ends of successive wires on first and second parts of articles, the first part of each article having a first portion and a second portion, comprising a track directly supporting the articles for movement thereon successively into a first mounting station and from the first mounting station to a second mounting station, holders for the articles at said stations, a single unit actuated intermittently to move the holders to position the articles at said stations accurately on the track, means to move wires successively into the first station with their ends respectively engaging the first portion of the first part and the second part of the article in the first station, means energizable by the engagement of an end of the wire with the first portion to cause relative movement of the wire and first part until said end of the wire engages the second portion, and separate means at the first and second stations to respectively secure the ends of each wire to the second portion and the second part of each article.

5. In an apparatus for mounting the ends of successive wires on first and second parts of articles at first and second mounting stations, a track directly supporting the articles extending through the stations, an article controlling unit for each station, each unit having a holder supported for movement between normal positions away from the track and holding positions over the track to hold articles respectively at their stations, a single actuator operated intermittently and connected to both holders to move the holders into their normal and holding positions, a feeding element for each unit movable between normal positions and feeding positions, means operatively connecting the feeding elements to their holders so that the elements will be moved respectively into their feeding and normal positions during movement of the holders into their normal and holding positions, the feeding elements separating the next article adjacent each station from the other articles near each station, and means to move the elements laterally to move the next articles on the track into the stations.

6. An apparatus for mounting the ends of successive wires on first and second parts of articles, the first part of each article having a first portion and a second portion, comprising a track directly supporting the articles for movement successively into a first mounting station and from the first mounting station to a second mounting station, holders for the articles at said stations, a single unit actuated intermittently to move the holders to position the articles at said stations accurately on the track, means to move wires successively into the first station with their ends respectively engaging the first portion of the first part and the second part of the article in the first station, means energizable by the engagement of an end of the wire with the first portion to cause relative movement of the wire and first part until said end of the wire engages the second portion, a circuit completed by an end of each wire contacting the second portion of each first part to bond said ends of each wire thereto at the first station, and means at the second station to mount the other end of each wire on the second part of its article.

References Cited in the file of this patent

UNITED STATES PATENTS

| | | |
|---|---|---|
| 2,225,853 | Baker et al. | Dec. 24, 1940 |
| 2,303,555 | Humphrey | Dec. 1, 1942 |
| 2,494,474 | Fermanian et al. | Jan. 10, 1950 |
| 2,677,173 | Fisler | May 4, 1954 |
| 2,721,373 | Midgley et al. | Oct. 25, 1955 |
| 2,748,235 | Wallace | May 29, 1956 |
| 2,819,784 | Brown | Jan. 14, 1958 |
| 2,842,166 | Wohlman | July 8, 1958 |
| 2,928,931 | Hoopes et al. | Mar. 15, 1960 |